United States Patent [19]

Laib

[11] 4,373,816
[45] Feb. 15, 1983

[54] SCANNING BEAM OPTICAL POSITION DETERMINING APPARATUS AND METHOD

[75] Inventor: Donald L. Laib, Dundee, Oreg.

[73] Assignee: Morvue, Inc., Portland, Oreg.

[21] Appl. No.: 223,826

[22] Filed: Jan. 9, 1981

[51] Int. Cl.³ ............................................. G01B 11/14
[52] U.S. Cl. ............................... 356/375; 250/237 G; 356/381
[58] Field of Search ............... 356/1, 2, 4, 373, 374, 356/375, 376, 381; 250/237 G

[56] References Cited

U.S. PATENT DOCUMENTS

| | | | |
|---|---|---|---|
| 3,671,726 | 6/1972 | Kerr | 250/571 |
| 3,783,270 | 1/1974 | Kamachi | 250/237 G |
| 3,951,548 | 4/1976 | Westell | 356/400 |
| 4,125,025 | 11/1978 | Suzuki et al. | 356/374 |
| 4,158,507 | 6/1979 | Himmel | 356/376 |
| 4,171,160 | 10/1979 | Ernst | 356/375 |
| 4,212,073 | 7/1980 | Balasubramanian | 356/375 |

*Primary Examiner*—R. A. Rosenberger
*Attorney, Agent, or Firm*—Chernoff & Vilhauer

[57] ABSTRACT

A method and apparatus for determining the location of a target surface by projecting a periodically scanning pattern of light onto the target surface, and comparing the time of projection of a predetermined point of the pattern along a predetermined path with the time of observing an image of the predetermined point of the pattern reflected along an intersecting receiver path. An apertured disc is rotated between a light source and a collimating projection lens assembly to produce scanning pattern of light. Photoelectric sensors generate reference and receiver electrical signals in response to projection and reception of the pattern of light, and the distance of the target surface from a reference location may be electrically determined as a geometrically defined function of the phase angle between the electrical signals.

In one embodiment of the apparatus, the scanning pattern of light is both projected and received through a single projection lens, permitting the angular separation between the projection path and the receiver path to be kept small, permitting measurement of a wide range of locations of the target surface within a phase angle variation of less than 360 degrees.

23 Claims, 14 Drawing Figures

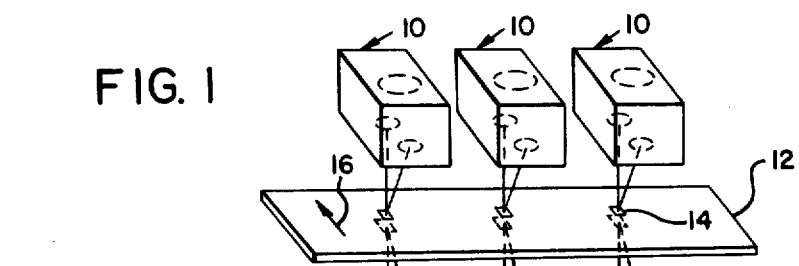
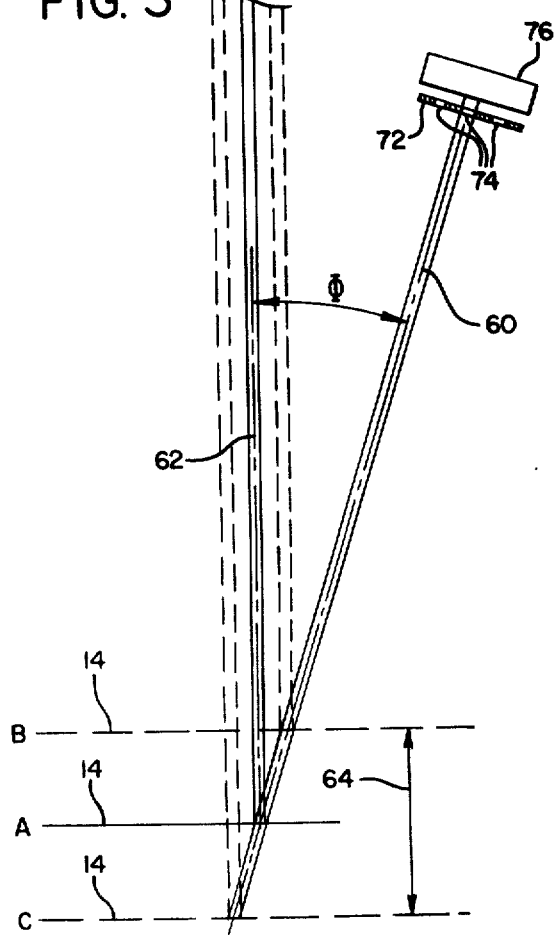
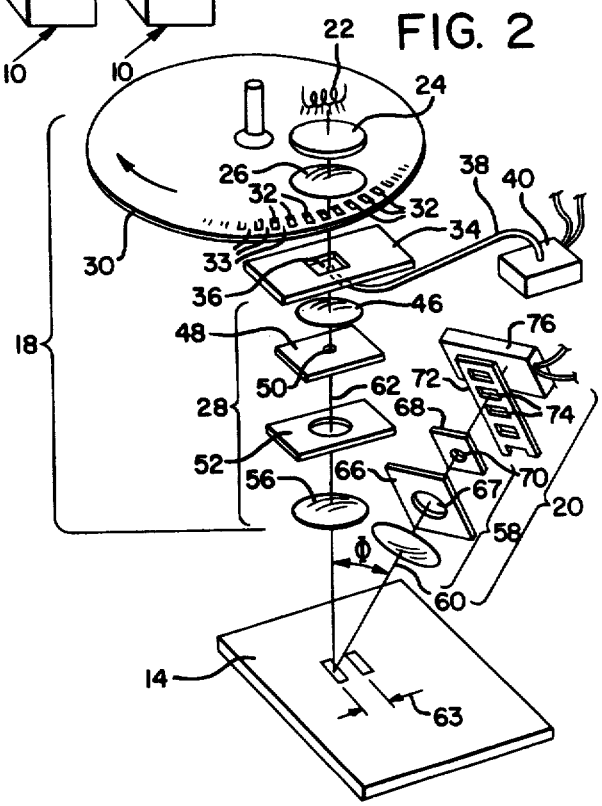
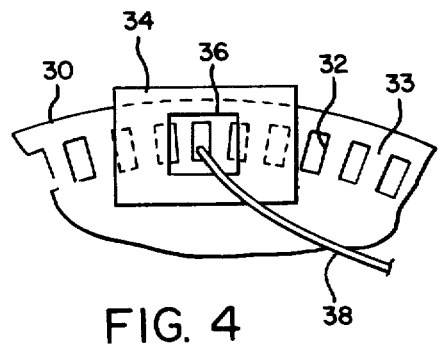
FIG. 1
FIG. 2
FIG. 3
FIG. 4

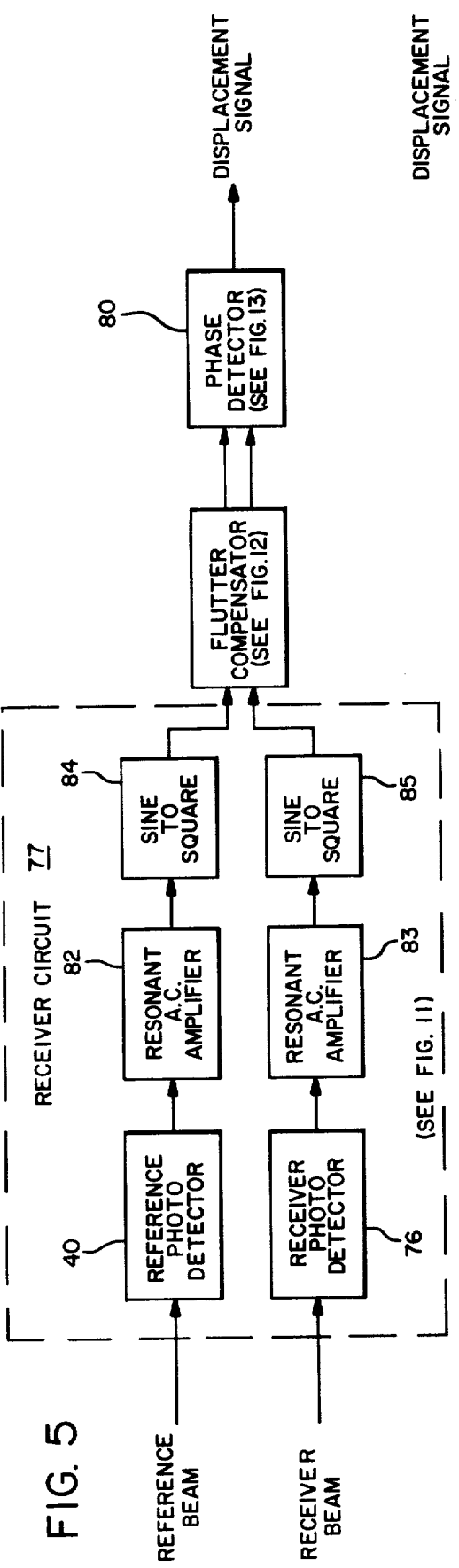
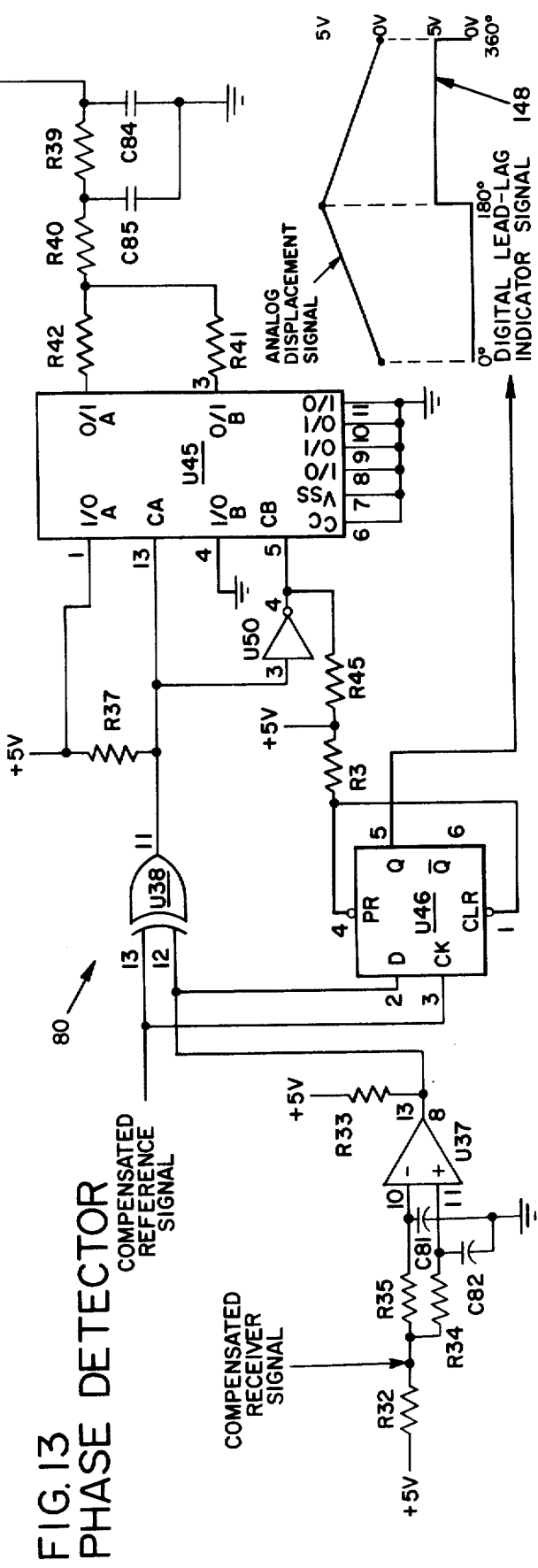
FIG. 5
FIG. 13 PHASE DETECTOR

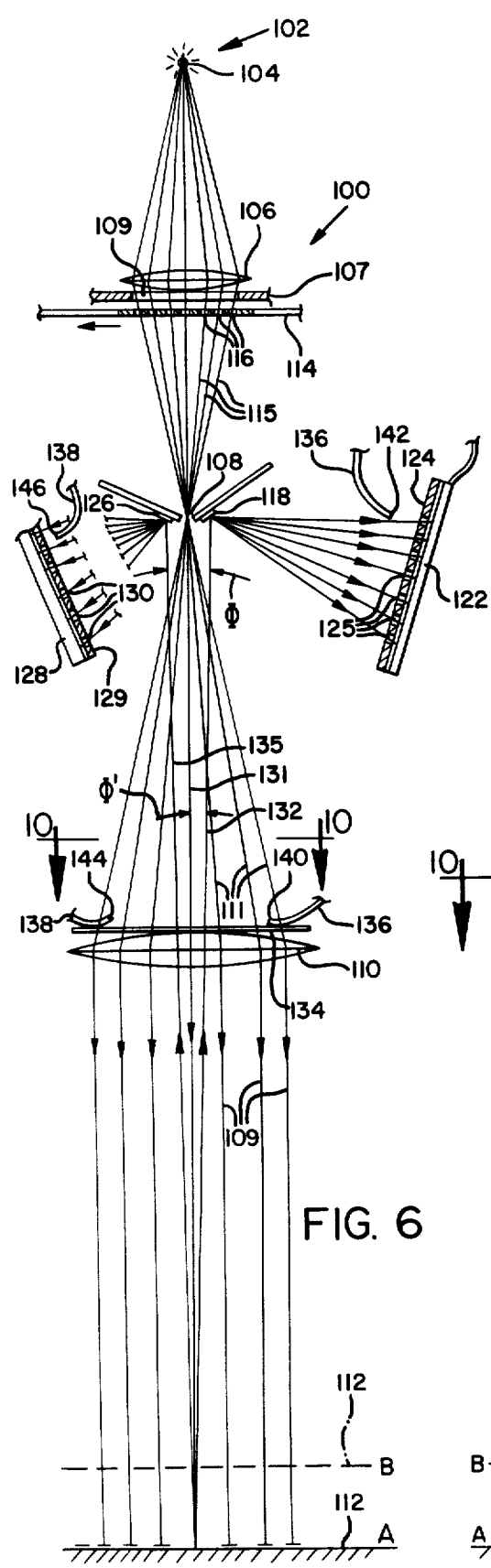
FIG. 6
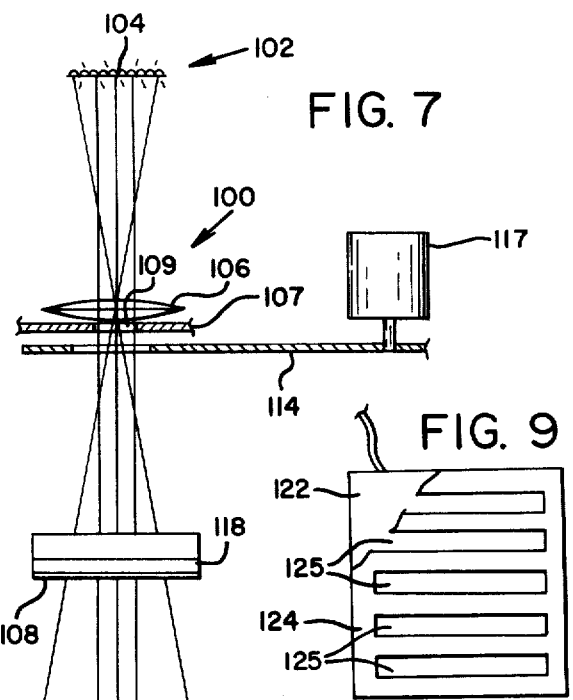
FIG. 7
FIG. 9
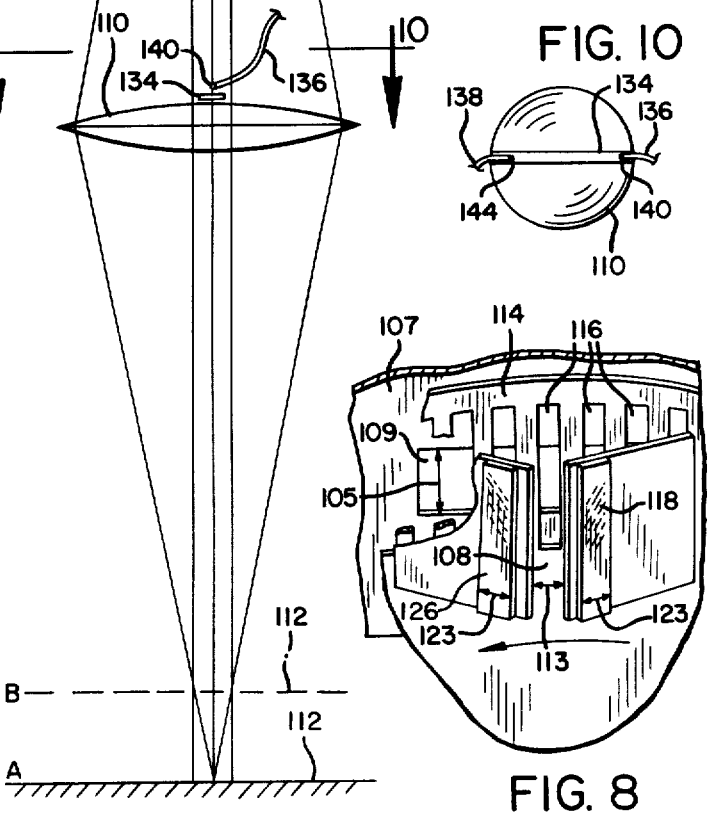
FIG. 10
FIG. 8

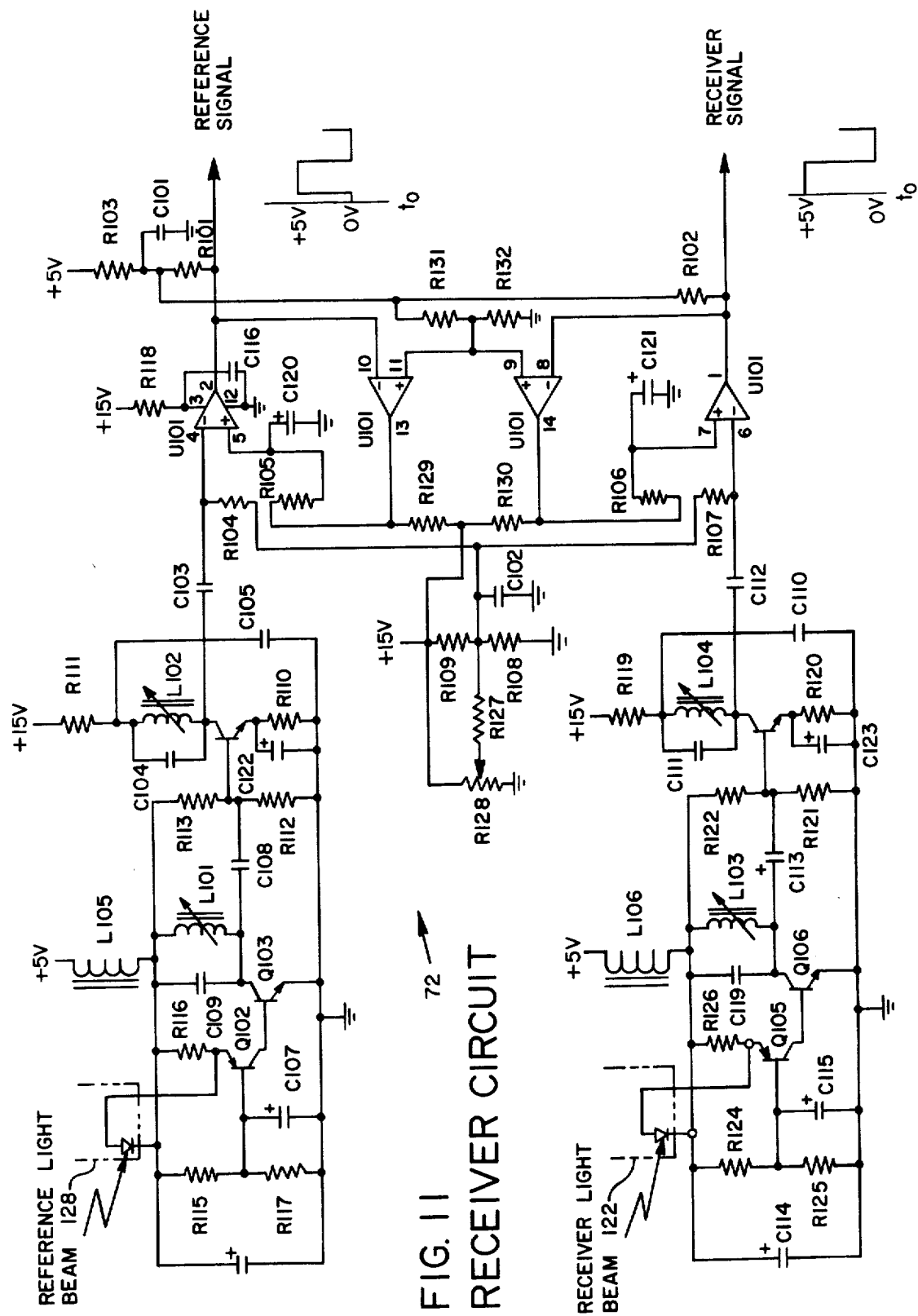
FIG. 11 RECEIVER CIRCUIT

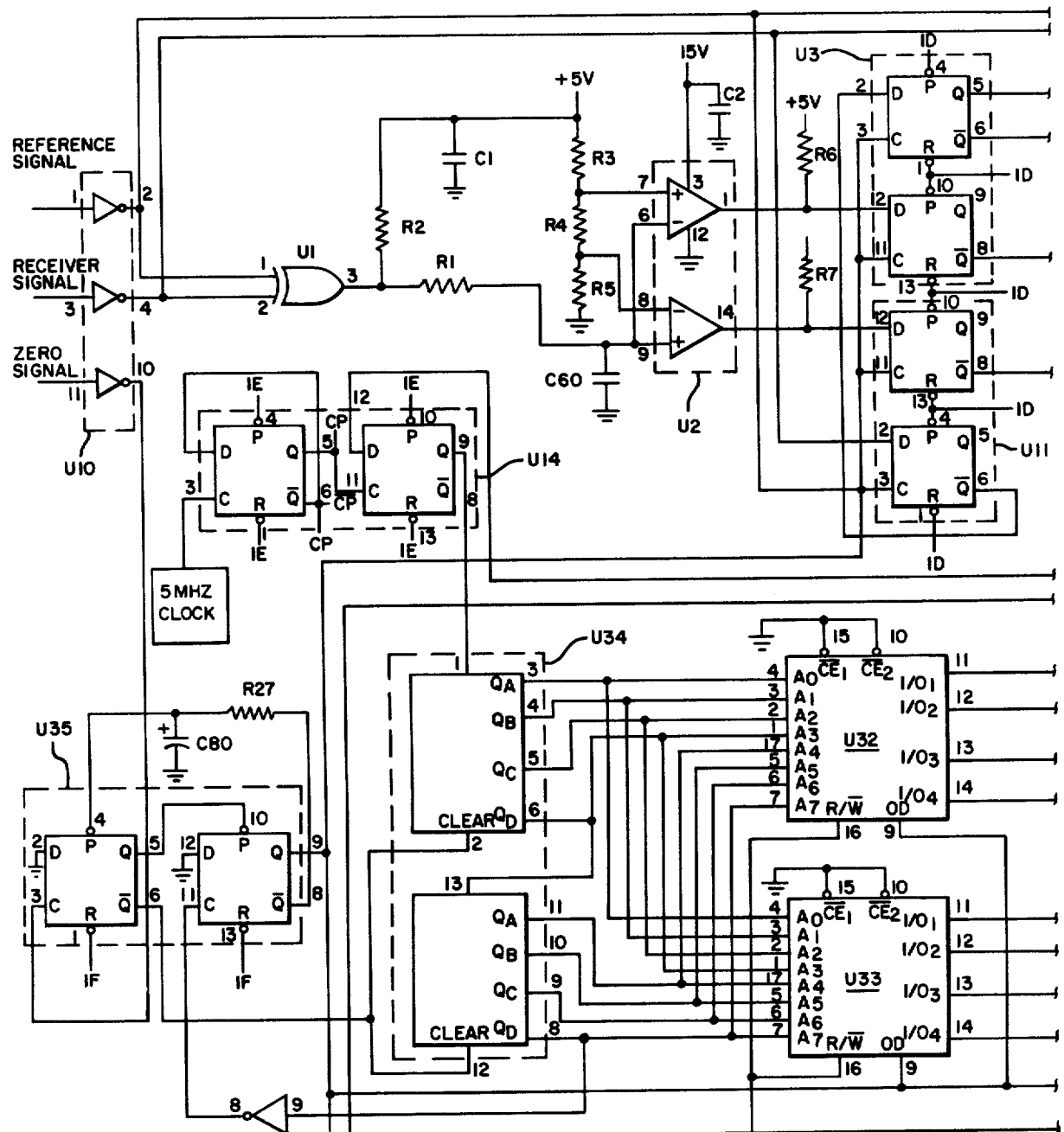
FIG. 12A
FLUTTER COMPENSATOR
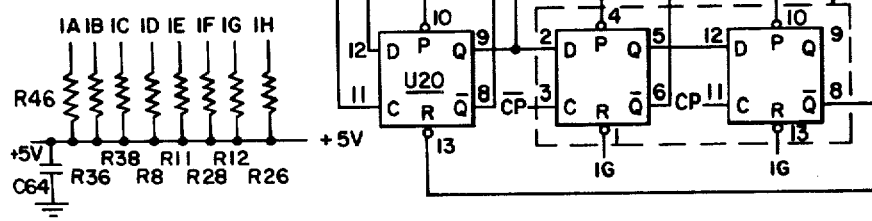

SCANNING BEAM OPTICAL POSITION DETERMINING APPARATUS AND METHOD

BACKGROUND OF THE INVENTION

This invention relates to apparatus and a method for rapidly determining the amount of separation between a target surface and a predetermined reference position, and particularly to apparatus for on-line precise monitoring of the thickness of moving material such as sawn lumber, which is subject to thickness variation throughout its lateral cross-section as a result of having been sawn from a waning portion of a log.

In a typical lumber mill on-line thickness monitoring of boards has, until recently, been performed visually by a human operator who views the sawn boards as they are moved along a conveyor toward the trim saws, and who manually actuates a trim saw to cut boards to the maximum standard length throughout which the board is of acceptable thickness over at least the minimum acceptable width. However, as will be readily appreciated, the human eye is not particularly adapted for precise monitoring of board thickness under such circumstances, especially when boards are moving at relatively high speed. A small error in operator judgment consistently applied could result in waste of large quantities of wood. It is therefore highly desirable that an on-line means be provided for automatically and precisely monitoring the thickness of the sawn boards at a point before the trim saws, and using such measurement to determine the length to which the boards are cut.

Previous to the present invention some of the known techniques for on-line monitoring of the thickness of moving material included the use of mechanical fingers and rollers, strain gauges with associated roller sensors, and similar mechanical and electro-mechanical devices using physical contact between the thickness sensing device and the moving material. In addition to their relative imprecision, such prior art devices, because of the frictional wear produced by the continuous contact with the moving material, constantly require readjustment and repair.

Relatively recently, non-contact optical measuring apparatus utilizing coherent light sources (lasers), such as the instruments described in Kerr U.S. Pat. No. 3,671,726, and Dawson U.S. Pat. No. 3,779,647, has also become known, but because of the complexity of laser apparatus, such equipment is undesirably expensive.

Optical measuring devices used in applications other than saw mills and the like where the products whose thickness is to be monitored move continually past a monitoring station depend on counting optical interference fringes produced as light passes through optical gratings. For example, the measuring devices disclosed in Pryor et al U.S. Pat. No. 3,785,737, Brake U.S. Pat. No. 4,079,252, Erickson U.S. Pat. No. 3,768,911, Takeda U.S. Pat. No. 3,833,807, Hayamizu U.S. Pat. No. 3,628,870, Wu U.S. Pat. No. 4,097,150 and deLang U.S. Pat. No. 3,175,093, all employ optical gratings to generate Moire interference fringes which may be electronically counted to determine the magnitude of displacement of one of the gratings. These latter systems, however, are not practical for measuring the thickness of boards and similar type production items because they require the use of optical gratings attached to the surface whose location is to be determined.

Stereoscopic and coincidence optical rangefinders of various types have long been known, but these depend on human operators to measure angular parallax between separate lines of sight and are too inaccurate and slow for use in repeated measurements of materials on a conveyor line.

What is needed, then, is a method for optically measuring the thickness of moving work pieces without physical contact with the work piece or use of coherent light, and using simplified optics for rapid automatic determination of the location of a target surface.

SUMMARY OF THE INVENTION

The aforementioned need for a non-contact measuring device for determining the location of a diffuse target surface relative to a reference position is fulfilled by the optical measuring device of the present invention. The preferred apparatus of the present invention includes a projector which periodically sweeps or scans beams of collimated light over a target surface, defining a periodically moving pattern of illuminated and non-illuminated areas projected on the target surface. A reference photoelectric sensing device is arranged to detect portions of the periodically sweeping beams of light at a predetermined position with respect to the projector, either directly or by receiving a reflection of the pattern of light from the target surface, producing a periodic reference electrical signal corresponding to the movement of the projected beams of light.

The path of motion of the light beams of the pattern defines a reference sweep plane, and a receiver, preferably located in the reference sweep plane, collects light reflected in a predetermined direction from the target surface. The receiver is angularly offset from the direction in which the beams of light are projected toward the target surface, and is in a position to receive light reflected from the target surface when the target surface is within a predetermined distance from the reference position. An optical lens or reflector establishes a receiver axis and focuses the light reflected from the target surface along the receiver axis toward a receiver photoelectric sensing device. The receiver device is masked to permit a maximum amount of the reflected image of the projected pattern of light to reach it only at a predetermined phase of the periodic sweeping motion of the projected light beams.

With the scanning pattern of light falling on a target surface at a predetermined distance from the projector, the photoelectric sensing device of the receiver receives the reflected image of the projected pattern of light from the target surface along the receiver axis, through the open portions of the mask, in a predetermined phase relationship with detection of the light beams by the reference photoelectric sensing device. However, because of the angular variation between the receiver axis and the reference axis, should the target surface be located in a plane at a different distance from the projector, the light beam images reflected from the target surface would fall on the photoelectric sensing device in a different phase relationship with the detection of the light beams by the reference photoelectric sensing device.

The reference and receiver photoelectric sensing devices, then, each generate a periodic electrical signal in response to receiving images of the projected sweeping beams of light. The phase relationship, however, between the reference electrical signal and the receiver electrical signal is related to the distance between the projector and the target surface, so that these signals will have a predetermined phase relationship when the target surface is at a reference position a predetermined distance from the projector, and a different phase relationship will result from any change in the distance between the projector and the target surface.

In accordance with the invention a signal corresponding to the phase angle between the reference electrical signal and the receiver electrical signal is determined automatically by electrical means. The phase angle signal is then electrically converted into an indication of the separation between the target surface and the reference position.

In a preferred embodiment of the invention a light source such as an incandescent filament is used. A relay lens projects a focused image of the light source into an aperture in an opaque diaphragm. The aperture is located at the focal point of a projection lens, such that light projected from the light source through the relay lens exits from the projection lens as substantially only parallel rays, being collimated by the telecentric combination of the aperture and the projection lens.

Between the relay lens and the telecentric aperture a chopper disc, having a plurality of apertures of uniform size evenly spaced about its periphery, is rotated at a predetermined speed, with the apertures passing through the path of light from the relay lens toward the telecentric aperture, generating the periodically scanning pattern of light. The projected image of the moving apertures of the chopper disc is kept in focus throughout a substantial depth of field because of the collimation provided by the telecentric aperture and the projection lens, so that a bright, sharp image of the scanning pattern of light is projected onto the target surface.

While a separate receiver lens and aperture combination may be used to receive light reflected from the image projected on the target surface, the relatively large angle required by location of a separate lens system in a position which does not interfere with the projection lens limits the range of target motion which may be observed without ambiguity. A smaller angle between the direction of the projection pattern of light and the image reflected from the target surface may be obtained by viewing the image on the target surface through the same projection lens.

This may be accomplished by locating a planar reflector immediately adjacent to the telecentric aperture to reflect the light received from the target surface toward a receiver photoelectric sensing device. A mask having apertures corresponding in size and shape to the apertures of the chopper disc is interposed in the path of the reflected image, and located at a distance from the telecentric aperture equal to the distance from the chopper disc to the telecentric aperture. A similar reflector may be located on the opposite side of the telecentric aperture and a similar photoelectric sensing device and mask may be used to produce a reference electric signal. The reflectors establish respectively a reference axis and a receiver axis along which reflected images of the pattern of light are conducted. These axes are preferably symmetrically arranged with respect to the projection axis, converging on the projection axis at a common point and thus establishing a reference position for a target surface.

The use of the projection lens both for projection of the pattern of light and for receiving reference and receiver images of the pattern of light reflected from the target surface has an additional benefit of promoting inexpensive production of a plurality of measuring devices according to the invention, all having closely similar optical characteristics with a minimum of lens position adjustment required because of slight dissimilarities of particular lenses. In particular, variations of the relay lens become insignificant, since the telecentric aperture collimates the projection of the pattern of light, and slight variations of the focal length of the relay lens affect merely the intensity of the image of the light source if the location of the light source and relay lens are predetermined with respect to the location of the telecentric aperture.

Depending on the angular separation between the reference axis and the receiver axis of the receiver, the method and apparatus of the invention may be used to unambiguously measure greater or smaller variations of distance between the projector and the target surface area, without exceeding three hundred sixty degrees difference in phase between the reference and receiver signals.

The instantaneous phase angle measurements determined by the apparatus may be electronically averaged to eliminate error caused by inconsequential irregularities in the physical dimensions and motion of the chopper disc and the electrical circuitry used.

The apparatus of the invention may be used to measure the thickness of a work piece traveling along a path by measuring the distance of the top surface of the workpiece from a reference position when the workpiece rests on a support whose location is known, or pairs of apparatus according to the invention may be used in caliper fashion to directly determine the thickness of a work piece. Variations of the cyclic rate of sweep of the light beam, of the angular relationship between the light beam projection axis and the receiver axis, and of the dimensions of individual projected beams of light each bear upon the measurable range of position and the accuracy of measurement.

It is therefore a primary objective of the present invention to provide an improved method and apparatus for determining the position of a target surface by optical and electrical means.

It is another important objective of the present invention to provide apparatus for rapidly measuring the separation between a target surface and a reference position without physical contact with the target surface.

It is another objective of the present invention to provide simplified and relatively inexpensive optical apparatus for accurate optical measurement of the thickness of a moving work piece.

It is a further objective of the present invention to provide apparatus which measures displacement of a target surface from a reference position without the need for laser apparatus or other sources of coherent light.

It is yet a further objective of the present invention to provide a measuring device which utilizes a projected scanning pattern of light beams to measure the location of a target surface without interference from ambient light sources.

It is a primary feature of the present invention that it provides a method of measuring location of a diffuse target surface without physical contact, by determination of a phase angle between a projected periodic pattern of light and a reflection of the same periodic pattern of light as viewed along a predetermined line of sight.

It is another feature of the present invention that it provides apparatus which uses a single lens for both projecting a pattern of light and receiving a reflected image thereof to accurately determine the location of a target surface within close tolerances, over a predetermined range of target surface motion locations.

It is a further feature of the present invention that it provides an automatically generated electrical signal corresponding to the displacement of a target surface from a reference position.

It is a primary advantage of the present invention that it provides a method and apparatus for measuring displacement of a target surface from a predetermined reference position, which are less expensive than previously known methods and apparatus requiring the use of coherent light.

It is another important advantage of the present invention that it provides apparatus which measures displacement of a target surface from a reference position more quickly and conveniently than devices which count optical diffraction interference fringes.

It is a further advantage of the present invention that it provides apparatus which may be used effectively to determine the position of a target surface which is somewhat rough.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIGS. 1–4 are directed to an illustrative embodiment of the optical system portion of the position-determining apparatus of the present invention.

FIG. 1 is a pictorial view of an exemplary array of measuring devices embodying the present invention as arranged to measure the thickness of a work piece.

FIG. 2 is a pictorial schematic view of an internal optical system for a typical one of the measuring device units shown in FIG. 1.

FIG. 3 is a simplified schematic diagram of the optical apparatus of FIG. 2 showing the manner in which the receiver detects the image of a projected beam of light reflected from a target surface located at various positions.

FIG. 4 is a fragmentary view of the measuring apparatus shown in FIG. 2, showing the optical fiber light conductor used in generating the reference signal.

FIG. 5 is a block diagram of the electronic circuitry used to process the electrical signals developed by the photoelectric detectors included in the measuring apparatus shown in FIGS. 1–4.

FIGS. 6–10 are directed to an alternative embodiment of the optical system portion of the position-determining apparatus of the present invention.

FIG. 6 is a schematic view of the alternative embodiment of the optical system.

FIG. 7 is another schematic view of the alternative embodiment of the optical system taken at right angles to the plane of FIG. 6.

FIG. 8 is a pictorial view of the telecentric slit aperture and a fragment of the chopper wheel of the embodiment of FIG. 6, on an enlarged scale.

FIG. 9 is a partially cut away view of the receiver mask and the receiver photoelectric sensing device of the embodiment of FIG. 6, on an enlarged scale.

FIG. 10 is an elevational view of the projection lens of the embodiment of FIG. 6, on a reduced scale, taken along line 10—10.

FIGS. 11–13 are electrical schematic diagrams of receiver, flutter compensator and phase detector circuits usable with the optical scanner system portion of the position-determining apparatus of the present invention.

FIG. 11 is a schematic diagram of an exemplary electronic receiver circuit.

FIGS. 12 A and B, when placed together side-by-side, are an exemplary flutter compensation circuit.

FIG. 13 is a schematic diagram of a phase detector circuit.

DETAILED DESCRIPTION OF THE INVENTION

Figure 12B:
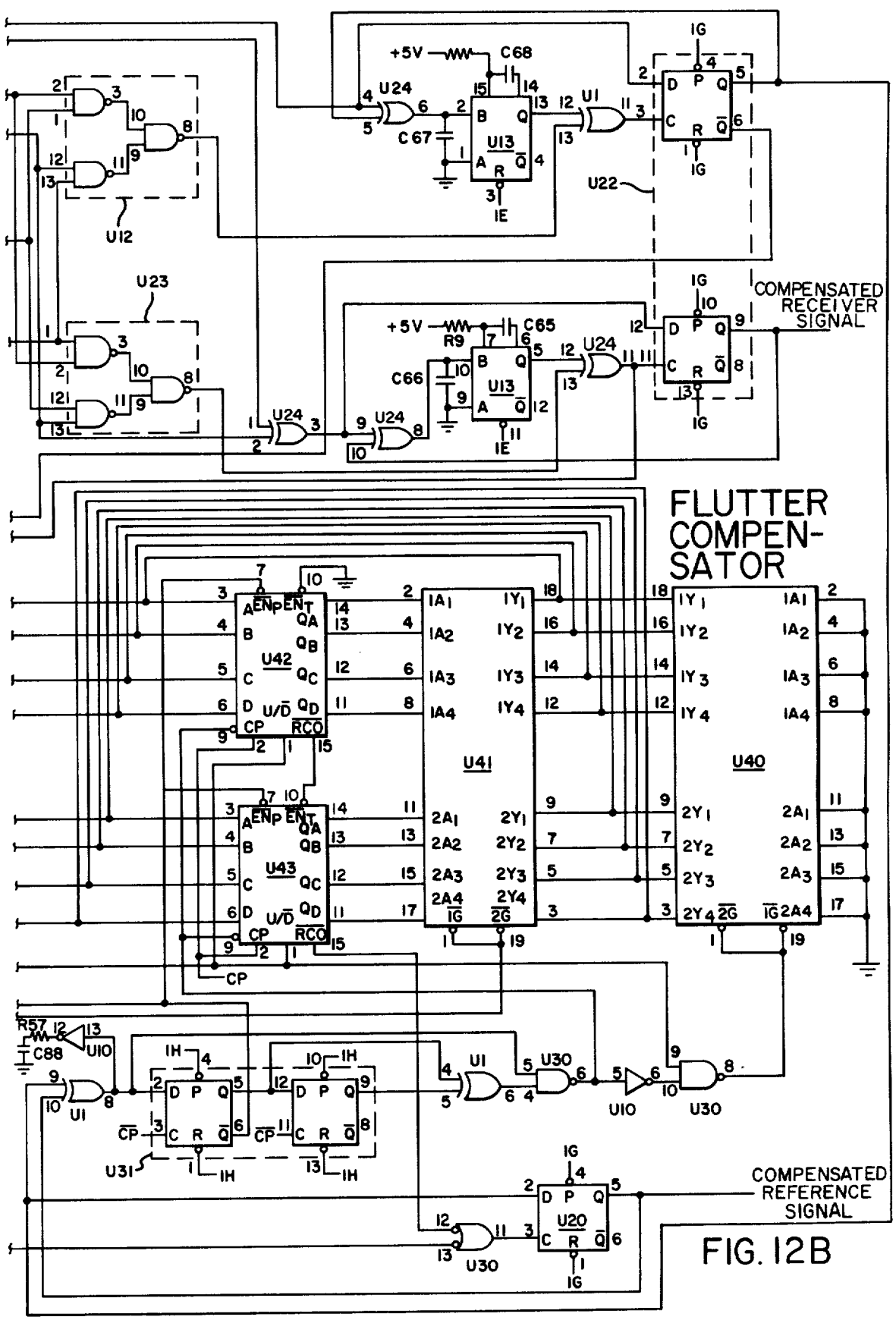

Referring to FIG. 1, three optical position determining scanners 10 embodying the present invention are shown arranged exemplarily for automatically determining the thickness of a workpiece such as a sawn board 12 passing between the scanners 10 and a supporting surface at various locations along its length. The board 12 is supported from below while the measuring devices 10 measure the location of a target surface 14 on the top of the board 12 as the board is moved in the direction indicated by the arrow 16.

As shown in FIGS. 2–4, an exemplary position determining scanner 10 comprises a projector 18 and a receiver 20. Starting from an incandescent filament light source 22 approximately 0.015 inch×0.35 inch (0.38 mm×8.89 mm) in size, light passes through a condenser lens assembly comprising a pair of lenses 24 and 26, then into a collimating projection lens assembly 28. Interposed between the condenser lens assembly and the collimating projection lens assembly 28 is an opaque chopper disc 30, having a plurality of apertures 32 and opaque sectors 33 arranged about its periphery, each aperture being, for example, approximately 0.047 inch (1.2 mm) in width as measured between its radially extending sides. The chopper disc 30 is mounted on a synchronous motor (not shown), and is rotated exemplarily at 3600 rpm. A scanner 10 having 128 apertures 32 thus interrupts the light emitted from the filament at the rate of 7680 times per second and thus periodically permits light to pass toward a target surface as 7680 sweeping beams per second.

A diaphragm 34 comprising an object plane aperture 36 is located adjacent to the chopper disc 30. The size of the aperture 36 is equivalent to two complete cycles of the apertures 32 of the chopper disc 30, or approximately about three sixteenths of an inch in width. Interposed in the center of the object plane aperture 36 is an end of an optical light conductor 38 which is used to transmit light received through the apertures 32 and the object plane aperture 36 to a reference photoelectric sensing device 40, producing a reference electrical signal to be compared with a receiver electrical signal to determine the phase separation between the two in a manner to be described more fully below.

The collimating projection lens assembly 28 comprises exemplarily a convex focusing lens 46, a diaphragm 48 having an aperture 50, a forward diaphragm 52 having a front aperture 54 which limits transmission of stray light, and a convex projection lens 56. The aperture 50 is centered about the coincident focal points of the focusing lens 46 and the projection lens 56, and is hereinafter referred to as a telecentric aperture. The telecentric aperture 50 is small enough to permit transmission of essentially only parallel light rays from the projection lens 56 toward the target surface 14, while the focusing lens 46 permits sharp images of the light source to be projected through the apertures 32 of the chopper disc as a pattern of scanning light beams.

After passing through the collimating projection lens assembly 28 the projected pattern of light is imaged upon the target surface 14, and since substantially only parallel rays are transmitted, the image of the pattern of light is projected sharply on the target surface object throughout the range of target surface positions which is of interest. The reflection of the light beam image on the target surface 14 of the workpiece is then transmitted through the receiver lens assembly 58, which defines a receiver axis 60. The receiver axis 60 converges toward intersection with the projection path 62 of the projection lens system 28 defining an angle Φ.

The relationship between the angle Φ (the angle between the optic axis 62 of the projection lens system 28 and the optic axis 60 of the receiver) and the spacing between corresponding parts of the apertures 32 in the chopper disc 30 is preferably such that the tangent of the angle Φ is equal to the size of the projected image width 63, as shown in FIG. 2, of a complete aperture 32 together with an opaque sector 33, divided by the total desired unambiguously measurable range of variations of the distance of the target surface from a predetermined reference position. Exemplarily, in the particular application of this invention to measure the thickness of lumber, the range as indicated by the arrow 64 is about 2⅛ inches (53.97 mm). For a range of 2⅛ inches (53.97 mm) and a spacing between corresponding points in the projected image of consecutive apertures 32 of about 0.42 inch (10.67 mm), the angle Φ is approximately 11.2 degrees. The angle is not particularly significant except that if the desired measurable range of the location of the target surface is substantially greater, then the angle Φ would be decreased correspondingly. Another way of expressing this relationship as a formula is that the unambiguously measurable range equals the projected aperture image spacing divided by the tangent of the angle Φ.

The receiver lens assembly 58 comprises an objective lens 65, which is preferably an achromatic lens, and a diaphragm 66 including a light-limiting aperture 67 which is used to reduce internal reflections and stray light in the system. A diaphragm 68 defines a collimating, depth-of-field enhancing aperture 70 which is centered about the focal point of the objective lens 65. The receiver 20 also includes a grating or mask 72 which is located where the projected image of the light beams on the target surface 14, as viewed through the receiver lens assembly 58, is generally in focus. As shown in FIG. 2 this grating 72 is aligned so as to be both perpendicular to the optic axis 60 of the receiver lens assembly 58 and perpendicular to the plane defined by the optic axes 62 and 60, respectively, of the projector lens assembly 28 and the receiver lens assembly 58.

Behind the receiver grating 72 is a photoelectric device 76 which measures the received light and generates a periodic receiver electrical signal whose frequency is the same as the frequency of projecting individual sweeping beams of light, but whose phase relationship to the reference electrical signal is dependent upon the position of the target surface, as may be more clearly seen with reference to FIG. 3. It is this difference in phase, caused by the position of the target surface 14 (thickness of the workpiece) which is detected and analyzed in the balance of the circuitry.

In accordance with the well-known relationship that the sum of the reciprocals of the object distance and the image distance is equal to the reciprocal of the focal length, the mask 72 in the receiver 20 is located in the image plane of the receiver lens 62. The light received along the receiver axis 60 from the target surface 14 passes through the receiver lens assembly 58 and the mask 72. The size and spacing of openings 74 of the receiver mask 72 correspond to the size and spacing of the image on the target surface 14 of the beams of light projected through the chopper disc apertures 32, multiplied by the magnification. The magnification of the received image at the mask 72 is equal to the ratio of the object distance to the image distance. Thus at one point in the projection cycle the light beam image of the chopper wheel apertures 32 directly and exacly overlies and corresponds with the apertures 74 in the receiver mask 72, and there is an exact correspondence in the overlay of the received image on the receiver mask. This relationship is of course subject to the limitations of the lens systems in that there are certain aberrations as well as imperfect collimation of the light beams. In point of fact the exact correspondence occurs at only one position in the measurable range of movement of the target surface, but the congruency is sufficiently close over the balance of the range that the system operates satisfactorily.

When the target surface 14 is located at the reference position A as shown in FIG. 3, the image of a light beam passing through an aperture 32 aligned with the object plane aperture 36 onto the target surface 14 is reflected along the receiver axis 60 and through the openings 84, producing an electrical output from the receiver photoelectric sensor 76 which is in phase with the reference signal produced by the reference photoelectric sensing device 40. If the target surface 14 is located at position B, which is closer to the projector 18, the image reflected from the target surface will coincide with the receiver grating 72 before the chopper disc has rotated as far as it had rotated for an image of a beam reflected from the target surface 14 located at the position A to coincide with the grating. This relationship produces a leading phase angle between the receiver signal and the reference signal, because of the direction of rotation of the chopper disc 30, indicated by the arrow 78. Conversely, if the target surface is farther away, the receiver signal will lag behind the reference signal, as is the case if the target surface 14 is located at position C.

The phase difference between the reference and receiver electrical signals is proportional to the target displacement. To obtain target displacement information in a useful form, these low level reference and receiver electrical signals are amplified, converted to square wave form and then fed via a flutter compensator 79 into a phase detector 80, as shown in FIG. 5.

The reference and receiver electrical signals contain a direct current component resulting from ambient light sensed by the photodetectors 40 and 76, and a periodic component corresponding to the scanning beams of light. Resonant alternating current amplifiers 82 and 83 are used to block the unwanted direct current (ambient light) component of the reference and receiver electrical signals and to increase the signal-to-noise ratio to a useful level, by band pass limiting, while amplifying the signals enough to drive sine wave-to-square wave converters 84 and 85.

The resonant amplifiers 82, however, convert small frequency deviations to indications of large phase variations. If the amplifier channels for reference and receiver signals were perfectly matched, that is, if their phase distortions and phase delays were always exactly equal, the errors would cancel in the phase detector. Unfortunately such precise matching is not economically practical. The non-matched phase distortion also would not be a problem if there were no frequency variations in the cyclic pattern of light projected by the measuring device 10. It is to minimize such frequency variations that a synchronous motor is used to drive the chopper disc 30. Flutter in the motor and geometric errors in the chopper disc 30 nevertheless cause frequency variations in the scanning cycle, which appear in the electrical signals as phase angle variations. Fortunately, the largest of such errors are cyclic and synchronous with the motor. This permits them to be measured and then electronically cancelled by a flutter compensator (FIGS. 12A and 12B).

The flutter compensator 79 adds a correction to one phase angles observed. To compensate for flutter, the compensator is zeroed in an initialization run in which it measures the phase difference between the reference and receiver signals as a function of chopper disc rotation, with a target surface 14 located at a reference position, such as the position A of FIG. 3. corresponding rising or falling edge of the receiver signal. These 256 measurements corresponding to one revolution of the chopper disc 30 are stored in memory. To compensate for this error later on, every time there is a transition of the reference signal to the flutter compensator, caused by a specific optical transition of the chopper disc, (i.e. light-to-dark, and vice versa), the reference electrical signal going to the phase detector 80 is adjusted by precisely the time measured during the initialization cycle. As a result, any such cyclic phase errors present during initialization do not show up at the output of the phase detector. This procedure also zeroes the scanner 10. That is, the position of the target surface 14 during the initialization of the flutter compensator becomes the position which will cause an indication of zero displacement thereafter.

An exemplary phase detector 80 consists of an EX-OR gate (i.e., an exclusive OR logic gate) whose two inputs are the square wave reference and receiver electric signals. Its output is a square wave whose duty cycle is proportional to the phase difference. This variable duty cycle square wave may be filtered to produce a direct current voltage proportional to the displacement of the target surface.

This output is ambiguous in that it gives the same voltage for two different target positions, since this type of phase detector does not discriminate between leading and lagging phase differences. Two sets of signals whose phase differences are equal, but of opposite direction, will produce the same voltage indication of phase angle. Therefore a D-type flip flop may be used as a leading/lagging detector to resolve the ambiguity.

While the embodiment described above provides analog measurements of phase and displacement, it is also possible to use exclusively digital information to determine displacement directly from each successive beam of light swept across the target surface. The digital values obtained by direct measurement of the delay between corresponding transitions of the reference signal and the received signal contain all the phase information. All of the signal processing after the amplifiers 82 and 83 may be digital, and instantaneous displacement may be calculated as the target surface displacement which will cause a full cycle phase difference between corresponding points in reference and receiver electric signals, multiplied by the ratio of the actual signal time difference to the full cycle period. The smoothed or filtered displacement may for example be a running mean for the largest number of samples consistent with the system response time required.

An alternative embodiment 100 of the optical apparatus of the invention, shown in FIGS. 6–9, comprises a light source 102, such as an incandescent lamp preferably having a filament 104 which is generally linear in shape. A relay lens 106, e.g. an f/1.6 triplet lens having a 25.4 mm focal length, is positioned two focal lengths, that is, 50.8 millimeters, from the filament 104. An aperture, for instance, a slit 108, aligned with the relay lens 106 and parallel with the filament 104 of the light source so that the relay lens 106 focuses an image of the filament within the slit 108, is located an equal distance from the relay lens 106, on the side opposite the light source 102.

A projection lens 110, preferably of at least half the speed of the relay lens, e.g., an f/3 achromatic convex lens, is aligned with the light source 102, the relay lens 106, and the slit 108, and spaced one focal length of the projection lens 110 from the slit 108, so that the position of the slit 108 relative to the projection lens 110 forms a telecentric system. The projection lens 110 then receives light from the light source through the slit 108, hereinafter referred to as a telecentric slit, and collimates the diverging rays 111 of light. The projection lens transmits the light received from the telecentric slit 108 in rays 109 which appear parallel as viewed in FIG. 6 toward a target surface 112 whose distance from a predetermined location is to be determined.

While reduction in the size of a telecentric aperture, as by narrowing the telecentric slit 108, provides an increase in the depth of field within which the image of the light source is sharply focused, reduction in the size of the aperture also reduces the total amount of light transmitted, and a compromise becomes necessary in order to ensure transmission of enough light for the operation of the apparatus. A telecentric slit 108 (see FIG. 8) having a width 113 of 3 millimeters and a length of 12 millimeters with a 120 mm focal length projection lens 110 has been found effective to provide a usable depth of field of at least 4½ inches (114 mm). Outside the limits of that field the signal/noise ratio and linearity of the measuring system are sharply reduced.

Directly adjacent to the relay lens 106, on the side nearer the telecentric slit 108, is a relay lens diaphragm 107 defining an elongated relay lens aperture 109 which extends across the full diameter of the relay lens with an exemplary height 105 of 0.05 inch (1.27 mm).

Between the relay lens diaphragm 107 and the telecentric aperture or slit 108, and preferably located as close as possible to the relay lens diaphragm 107, is a chopper disc 114 driven exemplarily by a synchronous motor 117 which is essentially an enlarged version of the chopper disc 30 of the previously described apparatus 10, with 256 apertures 116 extending radially and arranged evenly about its periphery. As the chopper disc 114 is rotated, preferably at 1800 rpm, it periodically interrupts the converging rays 115 of light transmitted by the relay lens 106 through the relay lens apertures 109 toward the telecentric aperture 108, allowing light to pass only through the apertures 116, and producing a scanning pattern of light and darkness which is projected toward the target surface 112.

While the projection lens 110 collimates the light in a plane perpendicular to the length of the telecentric slit 108, as shown in FIG. 6, the same is not true in a plane aligned with the length of the slit 108, as shown in FIG. 7, where the reason for orientation of the filament 104 of the light source 102 parallel to the telecentric slit 108 becomes more clear. A ray of light 131 from a central portion of the filament 104 is transmitted in a straight line through the relay lens 106, the aperture 116 of the chopper disc 114, the slit 108, and the projection lens 110 to the target surface 112.

FIGS. 6 and 7 are schematic views of the optical system of the position-determining apparatus in two respective orthogonal planes whose intersection coincides with the optic axis of the apparatus and which planes are also mutually orthogonal with the plane of the target surface 112. The plane of FIG. 6 is perpendicular to the slit 108, the filament 104, the receiver reflector 118 and reference reflector 126 and is also parallel to the direction of movement of the projected light pattern generated by the apertures 116 in the moving disc 114. The projection system is telecentric in the plane of FIG. 6 (but need not be so in the plane of FIG. 7) as a result of the slit 108 being placed at the focal point of projection lens 110, and the real image of filament 104 being relayed to a line within the slit by relay lens 106. The optical channels for the reference signal and the receiver signal are likewise telecentric in the plane of FIG. 6 due to the narrow width of receiver reflector 118 and reference reflector 126, the latter two elements also being positioned in the focal plane of lens 106. By rendering the optical system telecentric in the plane of FIG. 6 the depth of field and linearity of the system is increased, though at the expense of light throughput (or luminance). However, for the system to have maximum useful measurement range and linearity it must be telecentric in this plane. On the other hand, for maximum light throughput in those applications such as the one referred to previously, in which there is measurement of a moving strip of material, the optical system must not be telecentric in the plane (shown in FIG. 7) which is perpendicular to the direction of motion of the moving light pattern.

The optimum width of the moving light pattern, in the direction perpendicular to its direction of movement, is dependent on the particular application of the system. For example, if area measurement rather than line measurement is desired, then the opening of the aperture 109 is configured to correspond to that of the area desired to be measured. In a particular application where the point of interest is the measurement of the target surface along one axis (i.e., a line measurement as opposed to an area measurement extending in two orthogonal directions), then the aperture opening 109 may be configured to be relatively narrow, in the form of a slit. For example, a particular application of the latter would be in using the system to monitor the thickness of moving material. In such case it would be desired to obtain measurement of the position of the target surface averaged over an area whose dimension is small in the direction of movement of the material and relatively large in the transverse direction, by employing a narrow slit whose long dimension is aligned transverse to the direction of material movement but parallel to the direction of movement of the projected light beams generated by the chopper disc 114.

In the alternative embodiment 100, as contrasted with the previously-described embodiment 10, instead of there being a separate receiver objective lens and apertures the image of the scanning pattern of light as projected onto the target surface 112 is viewed through the projection lens 110 itself, by the use of a receiver reflector 118 located adjacent to the telecentric slit 108.

The receiver reflector 118 reflects the image toward a receiver photoelectric sensing device 122 used to produce a receiver electrical signal. Although a reflector of a different shape could be used, a planar receiver reflector 118 has the advantage of simplicity of construction, facilitating production of multiple units of the apparatus 100 of the invention having similar range measuring characteristics without the necessity for complex adjustment of location of the lenses and reflectors, and without requiring extremely close tolerances for the focal lengths of the lenses used. The width 123 of the receiver reflector 118 may preferably be equal to the width 113 of the slit 108 in the focal plane of the projection lens 110, thereby causing the receiver portion of the system to be telecentric in the same manner and to the same degree as the projection portion of the system. The plane of the receiver reflector 118 is aligned parallel to slit 108 and angled with respect to the path of light received from the target surface 112 in order to reflect the light toward the receiver photoelectric sensing device 122 which is located conveniently with respect to the remainder of the apparatus.

A receiver mask 124 interposed between the receiver reflector 118 and the receiver photoelectric sensing device 122 is located in the path of the light reflected on the receiver reflector 118, the distance between the receiver mask 124 and the receiver reflector 118 being equal to the distance from the chopper wheel 114 to the telecentric slit 108, so that a receiver mask 124 having apertures 125 of the same size and spacing as the apertures 116 of the chopper disc 114 will permit the complete reflected image of the projected scanning pattern of light to be incident upon the receiver photoelectric sensing device 122 only at a particular phase of the scanning cycle determined by the displacement of the target surface 112 from a reference location.

A planar reference reflector 126 which is preferably similar to the receiver reflector 118 is located preferably on the opposite side of the telecentric slit 108 from the receiver reflector 118, to similarly reflect another image of the projected pattern of light to a reference photoelectric sensing device 128. A reference mask 129 is located adjacent to the apertures 130 to produce a reference electric signal for comparison with the receiver electric signal in the manner described in connection with the previously described scanner 10.

Displacement of the target surface 112 from the position shown in FIGS. 6 and 7 in solid line toward the position shown in phantom line generates a change in the phase relationship between the signals developed respectively in the reference and receiver photoelectric sensing devices 122 and 128.

Because of the sensitivity required in the photoelectric sensing devices 122 and 128, in order to detect variations of intensity in the light received from the target surface, the projected scanning pattern of light, if reflected from the projection lens 110 onto the receiver and reference reflectors 118 and 126, will distort the signals generated by the photoelectric sensing devices 122 and 128. To avoid such distortion of the photoelectric sensing devices due to light reflected from the projection lens a non-reflective strip 134 (FIG. 10) about 0.1 inch (2.54 mm) wide, for example, is located extending across the diameter of the projection lens 110 parallel with the aperture 109. Light which might otherwise be reflected directly back from the surface of the projection lens 110 into the photoelectric sensing devices 122 and 128 is thus absorbed in the non-reflective area 134. Light striking the projection lens 110 at any great distance above or below its central axis will be reflected either above or below the photoelectric sensing devices 122 and 128 via reference reflectors 118 and 126, because of the curvature of the surface of the projection lens 110, and will therefore present no significant problem.

To further reduce the effects of spurious signals caused by internal reflections and scattering, a pair of fiber optic light pipes 136 and 138 are positioned in front of the non-reflective strip 134 to receive a portion of the projected scanning pattern of light and provide corrective signals 180 degrees out of phase relative to the resultant spurious signal, and of equal amplitude, thus cancelling the effect of the spurious signal on the photoelectric sensing devices 122 and 128. The desired effect is obtained by adjusting the position of the receiving end 140 of the light pipe 136, the end near the projection lens 110, to adjust the phase of the feedback, and positioning the other, or transmitting end 192 of the light pipe 136 to limit the amount of light projected from the light pipe onto the photoelectric sensing device 122. Similarly the receiving end 144 and transmitting end 146 of the light pipe 138 are positioned to provide a compensating light signal to the photoelectric sensing device 128.

The location of the reflectors 118 and 126 adjacent to the telecentric aperture, or slit, permits the angle Φ between the receiver axis 132 and the reference axis 135 to be smaller than is possible using a separate receiver lens and aperture assembly 58 as in the previously-described embodiment 10. With the angle Φ reduced in size, a greater range of target surface positions may be measured within a total phase angle shift of less than 360 degrees between the receiver and reference electrical signals, since the tangent of the angle Φ is reduced and a greater distance of motion toward or away from the apparatus 100 is required to cause a given shift in the apparent location of the image of the pattern of light as viewed along the receiver axis 132.

With the reflectors 118 and 126 located on opposite sides of the slit 108 there is an angle Φ' between the reference axis 135 and the projection axis 131, which causes the phase of the reference electric signal to vary from the phase of the projected pattern of light as target distance changes. The effective angle Φ is, then, the angle between the reference axis and the receiver axis.

In a symmetrically arranged apparatus as described here, the angle Φ is thus twice the angle Φ' between the receiver axis and the projection axis. The angle Φ, however, is smaller in this embodiment than is possible with the apparatus of the first described embodiment of the invention, because the light is both projected and received through a single lens, eliminating the necessity for a large angle Φ to avoid physical interference between the projection lens assembly and the receiver lens assembly.

Because the scanning pattern of light is both projected and received through the projection lens 110 in the measuring apparatus 120, the problems of adjustment of lens positions in order to achieve a desired level of accuracy are largely eliminated. Although the accuracy of the focal length of the projection lens is critical, as much as 5% variation of the focal length of the relay lens 106 can be tolerated without requiring relocation of the relay lens 106 or the light source 102 relative to the aperture 108.

This permits multiple units of the apparatus to be produced by location of the light source 102, the relay lens 106, the telecentric aperture 108, and the reflectors 118 and 126, at predetermined locations on a base plate. With the masks 124 and 129 for the receiver and reference photoelectric sensing devices 122 and 128 having apertures 125 and 130 corresponding in size and spacing to the apertures 116 of the chopper disc 114, and with the masks 124 and 129 each spaced from the respective reflector a distance equal to the separation between the telecentric aperture or slit 108 and the chopper disc 114, the positions of the receiver and reference masks and photoelectric sensing devices may likewise be predetermined and manufactured mechanically. Provision, then, of a projection lens 110 whose focal length is determined within less than 1% of error permits production of a plurality of measuring devices embodying the present invention within 1% optical error tolerance. While the image of the incandescent filament 104 of the light source 102 may not be focused precisely on the telecentric slit 108 if the focal length of the relay lens 106 is not precisely accurate, the major disadvantage of an inaccuracy of the focal length of the relay lens 106 is a reduction in the intensity of the received light signal.

While the invention has been described with reference to apparatus utilizing light from an incandescent filament, it will be understood that it is possible to similarly utilize radiant energy of any selected frequency in the spectrum from ultraviolet to infrared, and the word "light" as used herein is to be interpreted accordingly.

It should also be recognized that the functions of the mechanically driven apertured disc used to generate the scanning pattern of light beams projected toward the target surface whose position is to be determined could be carried out by other apparatus, for example, an electrically-excited acousto-optic beam deflector. The present state of the art, however, makes the use of such equipment undesirably expensive, and the hereinbefore disclosed apparatus is therefore preferable for carrying out the method of the present invention for determining the location of a target surface.

Exemplary electronic circuits usable in conjunction with either of the scanner embodiments 10 or 100 are shown schematically in FIGS. 11–13 and consist of three main sections: the receiver (FIG. 11), the flutter compensator (FIG. 12) and the phase detector (FIG. 13).

The receiver circuit 77, including the photoelectric sensors 122 and 128, detects the reference and receiver light beams, converts them to electrical signals which are then filtered, amplified and converted into square wave forms respectively. The flutter compensator 79 then processes the two receiver circuit output signals to remove any flutter (as previously described) therein that would otherwise cause erroneous indications of target surface position values. The phase detector 80 takes the two respective flutter compensated reference and receiver signals, compares them to obtain the net phase difference between them and generates as an output a voltage level which is representative of the position of the target surface.

As the position of the target surface varies, the output voltage level, corresponding to the phase difference, varies accordingly in linear fashion. However, the ambiguity present because of phase differentials exceeding 180° is resolved by providing a digital lead/lag indicator signal 148 (see the electrical signal diagrams accompanying the output voltage level in FIG. 13).

Electronic components in the schematic diagrams of FIGS. 11–13 are listed in Table 1 hereof where their values or identification may not be sufficiently clear from the schematic diagrams. Nevertheless, it is recognized that the functions herein described could be implemented by various specific combinations of circuit components, and in disclosing the schematic diagram of this exemplary embodiment no limitations of the concepts and implementing configurations of the present invention are intended.

TABLE 1

| Component | Description | Value/Type |
|---|---|---|
| C101, C102, C105, C106, C110, C114, C116, C117, C118, C120, C121 | Capacitor | 15 uf 20 v |
| C103, C112 | Capacitor | .02 uf |
| C104, C109, C111, C119 | Capacitor | .015 uf metalized polyester |
| C107, C108, C113, C115 | Capacitor | .1 uf |
| C122, C123 | Capacitor | .05 uf |
| C1, C2, C65–C68 | Capacitor | .02 uf |
| C60, C88 | Capacitor | .05 uf |
| C64, C81 | Capacitor | 15 uf 20 v |
| C80 | Capacitor | 2.2 uf |
| C82 | Capacitor | .001 uf |
| C84, C85 | Capacitor | .056 uf metalized polyester |
| L101, L102, L103, L104 | Choke, variable | 20–60 mh |
| L105, L106 | Filter inductor TD3-Q4-TA | |
| Q102–Q105 | Transistor 5086 | |
| Q101, Q103, Q104, Q106 | Transistor 5088 | |
| R101, R102, R129, R130, R131 | Resistor | 1 K ohms |
| R103, R111, R118, R119 | Resistor | 10 ohms |
| R104–R107 | Resistor | 100 K ohms |
| R108, R109 | Resistor | 10 K ohms |
| R110, R120, R115, R124 | Resistor | 1 K ohms |
| R112, R113, R121, R122 | Resistor | 1 meg |
| R116, R126 | Resistor | 499 K ohms |
| R117, R125 | Resistor | 3.3 K ohms |
| R127 | Resistor | 49.9 K ohms |
| R128 | Potentiometer | 10 K ohms |
| R132 | Resistor | 2.7 K ohms |
| R1 | Resistor | 620 K ohms |
| R2, R6, R7, R32, R33, R37, R45 | Resistor | 3.3 K ohms |
| R4 | Resistor | 2.2 K ohms |
| R9, R10 | Resistor | 2.7 K ohms |
| R3, R5, R8, R11, R12, R26, R27, R28, R36, R38, R46 | Resistor | 1 K ohms |
| R34, R35, R39, R40 | Resistor | 10 K ohms |
| R41, R42 | Resistor | 100 ohms |
| R57 | Resistor | 100 K ohms |
| U1, U24, U38 | IC 74LS86 | |
| U2, U37 | IC LM 339 | |
| U10, U50 | IC 74LS04 | |
| U3, U11, U14, U20, U21 U22, U31, U35, U46 | IC 74LS74 | |
| U12, U23, U30 | IC 74LS00 | |
| U13 | IC 74221 | |
| U32, U33 | IC AM9111 DPC or 2111 A-2 256×4 RAM | 250 ns |
| U34 | IC 74LS393 | |
| U40, U41 | IC 74LS244 | |
| U42, U43 | IC 74LS669 | |
| U45 | IC CD4066B | |

TABLE 1-continued

| Component | Description | Value/Type |
|---|---|---|
| U101 | IC LM 339 | |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for determining the location of a target surface within a predetermined range of possible locations with respect to a reference location, comprising:
 (a) producing a moving pattern of light;
 (b) projecting said moving pattern of light in a first predetermined direction onto said target surface to produce thereon a moving pattern of illuminated and non-illuminated areas;
 (c) producing a reference signal corresponding to said moving pattern of light;
 (d) receiving an image of said moving pattern of light reflected in a second predetermined direction from said target surface;
 (e) producing a receiver signal in response to receiving said reflected image;
 (f) measuring the separation between corresponding points in said reference signal and said receiver signal; and
 (g) determining the location of said target surface relative to said reference position as a function of said separation.

2. The method of claim 1 including the steps of periodically producing said moving pattern of light, producing said reference and receiver signals as periodic reference and receiver electrical signals and electrically determining said separation as a phase angle between said reference electrical signal and said receiver electrical signal.

3. The method of claim 2, including the steps of measuring irregularity in said moving pattern of light, and adding corresponding corrections to said reference signal before determining said phase relationship.

4. The method of claim 1, including in step (a) moving an aperture defined in opaque scanner means located between a source of light and said target surface for producing said moving pattern of light and optically transmitting light from said source of light through said aperture toward said target surface.

5. The method of claim 1 wherein said first and second predetermined directions define an included angle which is sufficiently small that movement of said target surface through said predetermind range of possible locations produces a change in said phase relationship no greater than 360 degrees.

6. The method of claim 1 including as part of step (c) the steps of receiving an image of said pattern of light reflected from said target surface in a third predetermined direction and generating said reference signal in response to receiving said image reflected in said third predetermined direction.

7. Apparatus for measuring the separation between a target surface and a predetermined reference position with a predetermined degree of accuracy within a predetermined range of target surface locations, comprising:
(a) projection means for projecting a pattern of light along a predetermined projection axis and scanning said pattern of light over a target surface at a predetermined sweep rate;
(b) reference means for receiving a reference image of said pattern of light;
(c) reference photosensitive means included in said reference means for producing a reference signal in response to receiving said pattern of light;
(d) receiver means for receiving light reflected from said target surface along a receiver axis having a predetermined angular relationship to said projection axis;
(e) receiver photosensitive means included in said receiver means, for producing a signal in response to receiving a said pattern of a reflected light from said target surface; and
(f) phase detector means for determining the phase relationship between said receiver signal and said reference signal.

8. The apparatus of claim 7, said projection means including collimating means for projecting said pattern of light onto said target surface in a substantially constant pattern size as measured in at least one dimension, throughout said range of target surface locations.

9. The apparatus of claim 8, said collimating means including a projection lens and means defining a telecentric aperture for focusing said pattern of light on said target surface throughout said predetermined range of target locations.

10. The apparatus of claim 7 wherein said receiver means comprises a receiver objective lens, means defining an aperture located on the opposite side of said receiver objective lens from said target surface for enhancing the depth of field of said receiver means, and mask means for permitting said reflected image to fall on said receiver photosensitive means when said reflected image has a predetermined location with respect to said receiver axis.

11. The apparatus of claim 7 including optical fiber means for transmitting a portion of said pattern of light from a predetermined location with respect to said projection means to at least one of said reference means and said receiver means.

12. The apparatus of claim 7 wherein said projection means includes a light source, lens means for projecting an image of said light source toward said target surface, and apertured scanner means located between said light source and said target surface for defining and scanning said pattern of light.

13. The apparatus of claim 12 wherein said lens means includes a projector lens, means defining a telecentric aperture surrounding the focal point of said projector lens, and relay lens means for focusing an image of said light source within said telecentric aperture, said scanner means being adapted to move said pattern of light in a predetermined sweep direction and said telecentric aperture being an elongate slit having its longitudinal axis oriented perpendicular to said sweep direction.

14. The apparatus of claim 7, said receiver means including receiver reflector means located on said receiver axis for reflecting said image of said pattern of light to said receiver photosensitive means, the size of said receiver reflector means being limited to reflect substantially only light received along said receiver axis to said receiver photosensitive means.

15. The apparatus of claim 7, said reference means including reference reflector means defining a reference axis having a predetermined angular relationship to said receiver axis and said projection axis, for reflecting light received from said target surface to said reference photosensitive means, the size of said reference reflector means being limited to reflect substantially only light received along said reference axis to said reference photosensitive means.

16. The apparatus of claim 7 wherein said projection means includes a light source and projection lens located between said light source and said target surface, said projection means having a light absorbent non-reflective material interposed between said light source and the portion of the surface of said projection lens oriented where it is capable of reflecting said pattern of light onto said reference and receiver photosensitive means.

17. The apparatus of claim 7, further comprising optical means for defining a reference axis along which to receive a reference image of said pattern of light, receiver mask means for permitting a receiver image of said pattern of light to fall on said receiver photosensitive means substantially only when said receiver image of said pattern of light is reflected from said target surface along a path having a predetermined location with respect to said receiver axis, and reference mask means for permitting a reference image of said pattern of light to fall on said reference photosensitive means substantially only when said reference image of said pattern of light is reflected from said target surface along path having a predetermined location with respect to said reference axis.

18. The apparatus of claim 7 including flutter compensator means for reducing the effect of irregularities in scanning said pattern of light prior to determination of said phase relationship.

19. The apparatus of claim 7 including means for determining the mean of a plurality of successive measurements of said phase relationship.

20. The apparatus of claim 7, said projection means including a projection lens, and at least one of said reference means and said receiver means also including said projection lens.

21. Apparatus for determining the position of a target surface, comprising:
(a) scanner means for providing a moving pattern of light having a predetermined regular sweep rate and sweep frequency;
(b) means for projecting said pattern of light in a predetermined direction toward said target surface;
(c) reference photosensitive means for detecting said pattern of light at a predetermined position with respect to said scanner means and generating a reference electrical signal in response thereto;
(d) receiver means for detecting an image of said pattern of light reflected in a predetermined direction from said target surface and generating a receiver electrical signal in response thereto; and
(e) electrical means for determining a phase angle between said reference electric signal and said receiver electric signal.

22. The apparatus of claim 21, wherein said scanner means for providing a pattern of light comprises a light source, an apertured disc located between said light source and said target surface, and means for rotating said apertured disc to periodically interrupt the path of light from said light source toward said target surface.

23. The apparatus of claim 21, said scanner means including an object plane aperture adjacent to said apertured disc, and said reference photosensitive means including optical fiber light conducting means located within said object plane aperture for receiving a portion of said beam of light and transmitting it to a reference signal photoelectric device for generating said reference electrical signal.

* * * * *